(No Model.)
J. F. WALTERS & J. J. BROWN.
SAFETY WATER GAGE.
No. 465,605. Patented Dec. 22, 1891.
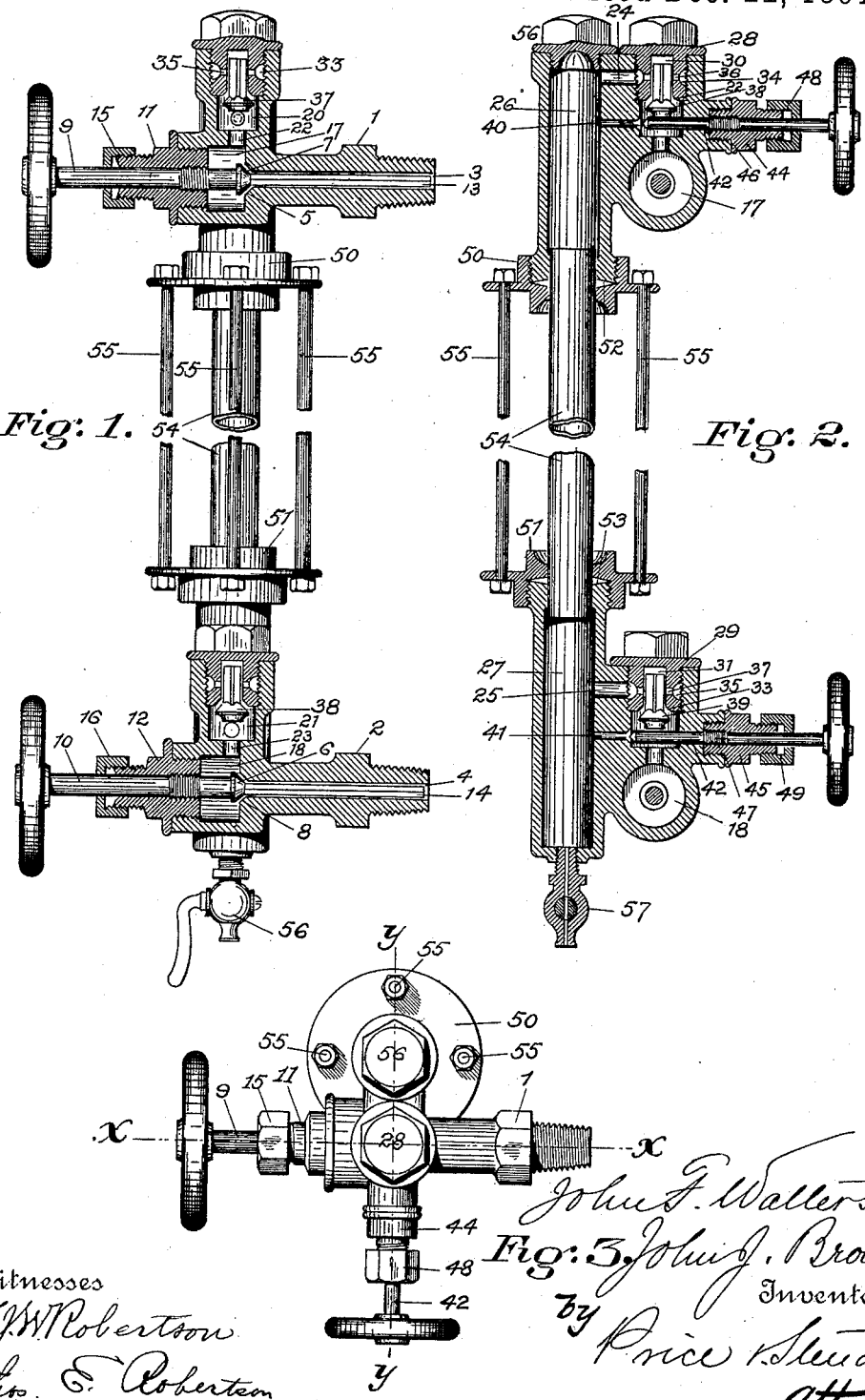
Witnesses
T. J. W. Robertson
Thos. E. Robertson
Inventors
John F. Walters
John J. Brown
by Price & Stewart
Attys.

UNITED STATES PATENT OFFICE.

JOHN F. WALTERS AND JOHN J. BROWN, OF BALTIMORE, MARYLAND.

SAFETY WATER-GAGE.

SPECIFICATION forming part of Letters Patent No. 465,605, dated December 22, 1891.

Application filed March 10, 1891. Serial No. 384,520. (No model.)

*To all whom it may concern:*

Be it known that we, JOHN F. WALTERS and JOHN J. BROWN, citizens of the United States, and residents of the city of Baltimore and State of Maryland, have invented certain new and useful Improvements in Water-Gages, of which the following is a specification.

Our invention consists in an improved water-gage for steam-boilers.

The object of our invention is to provide an automatic valve mechanism for water-gages, whereby the escape of steam and water and the consequent scalding of the engineer or other person is prevented when the water-gage tube is broken. Another important function of our automatic valve mechanism for water-gages consists in the avoidance of any possible drainage of the boiler and injury to it.

Another feature of our invention consists of a structure whereby the glass tube can be quickly and easily inserted into the gage-cylinder from the top.

A third feature is a device by which the glass and other parts of the gage can be readily flushed and cleaned.

In the drawings, Figure 1 is a side elevation of our water-gage, a part being in section. The section shown in this view is taken through the line $x\ x$ of Fig. 3. Fig. 2 is a vertical section of our water-gage, through the line $y\ y$ of Fig. 3. Fig. 3 is a plan of our water-gage.

In the drawings, 1 and 2 represent bars or spigots, which are threaded and screwed in the holes in a boiler or manifold or water or other liquid column, the upper of said holes being above the desired water-line and the lower one below it.

3 and 4 are the water-ways through the center of these spigots.

5 and 6 are valve-seats on the inner ends of the water-ways 3 and 4.

7 and 8 are valves upon the valve-stems 9 and 10. The valve-stems 9 and 10 are threaded, and upon them are screwed the nuts 11 and 12, which are screwed into the sides of the spigots, so as to close the chambers 17 and 18, cored in the spigots.

13 and 14 are square rods, which are extensions of the valve-stem beyond the valves 7 and 8, and which are employed to keep the water and steam ways 3 and 4 open and prevent their being stopped by dirt or crust.

15 and 16 are packing-caps, through which the valve-stems 9 and 10 pass and which are screwed onto the tops of the plugs 11 and 12, and which contain packing material by which the steam-tight joint is made around the valve-stems 9 and 10. 17 and 18 are chambers on the interior of the spigots.

20 and 21 are cylinders cored into the casting which forms the spigot and extending downward toward the chambers 17 and 18, with which they communicate by the drilled holes 22 and 23.

24 and 25 are cored channel-ways in the spigot-casting near the top, and which channel-ways make a communication between the cylinders 20 and 26 and 21 and 27, respectively.

28 and 29 are plugs which are threaded and tapped into the tops of the cylinders 20 and 21. Each of these plugs is bored in its center with a hole 30 and 31, the lower end of which 32 and 33 is beveled to form the valve-seat. Around the exterior is turned a groove 34 and 35, and holes 36 and 37 are drilled through from this groove into the holes 30 and 31 in the interior of the plug. With the plugs and screw in place, the groove 34 and 35 stands opposite the channel-way 24 and 25, thus forming a continuous communicating passage-way from the chambers 20 and 21 to the cylinders 26 and 27.

38 and 39 are puppet-valves having stems, which are fluted, rising from the apex of the cone. These stems project into the holes 30 and 31 in the plugs 28 and 29, and the valves 38 and 39 bear upon the valve-seats 32 and 33 and close the passage-way between the chambers 20 and 21 and the cylinders 26 and 27, respectively. The valves are inverted and are kept open by gravity alone.

40 and 41 are second part of channel-ways connecting the chambers 20 and 21 with the cylinders 26 and 27. The inner ends of these channel-ways are beveled to form a valve-seat.

42 and 43 are valve-stems which are screwed into the plugs 44 and 45, which are themselves screwed into holes 46 and 47 in the sides of the spigots.

48 and 49 are packing-caps surrounding the valve-stems 42 and 43, and containing packing material whereby a steam-tight joint is made around the valve-stems 42 and 43. The ends of the valve-stems 42 and 43 are larger than the channel-ways 40 and 41 and the ends are turned into conical form, so as to fit the valve-seats on the ends of those channel-ways next to the valve-chamber.

50 and 51 are perforated caps which are screwed upon the ends of the cylinders 26 and 27, which are opposite to one another. These caps are each provided with a laterally-extending flange on its exterior.

54 is the glass gage-tube, which fits snugly into the aperture of the cylinder 26 in the apertures in the centers of the caps 50 and 51 and in the hole in the top of the cylinder 27. Between the extremities of the cylinders 26 and 27 and the caps 50 and 51 is placed a suitable packing 52 and 53, which may be compressed upon the exterior of the gage-tube by screwing the caps down upon it.

55 and 55 are rods passing through holes in the flanges of the caps 50 and 51, and which are secured thereto by nuts on the upper and lower sides of said flanges, or otherwise, for the purpose of protecting the glass-gage from injury by an accidental blow from any source.

56 is a plug screwed into the top of the cylinder 26, and by which it is closed.

57 is a petcock by which the lower cylinder 27 may be drained.

It will be seen from an examination of Fig. 2 that the removal of plug 56 will make it possible to insert the glass tube through the top of the cylinder 26 and pass it down through the apertures below, in which it is to stand. The caps 50 and 51 may then be screwed up so as to compress the packing upon the glass tube. The rods 55 and 55 will then be put into place. This is a quick and simple method of adjustment.

The operation of the device is as follows: When a glass tube is in place and properly packed, steam and water are admitted by withdrawing the valves 6 and 7 from their seats. The pressure on both sides being equal, they will remain in the position shown in the drawings, held so by gravity alone, and the steam and water will flow around them and through the channel-ways above them and the height of water will be registered in the gage-tube. If now the gage-tube be broken, the counterbalancing of these valves is at once disturbed. The pressure below them being greater than above, they will be raised and the passage-way to the cylinders 26 and 27 closed. A new tube may now be inserted without fear of the engineer being scalded, and when the plug 56 is replaced the equilibrium of pressure in the gage will be re-established and the valves will fall back by gravity and open the passage-ways; or, if the equilibrium is not at once established in this way, it may be re-established by opening one of the steam-ways 40 and 41 and allowing the steam or water to enter the gage-tube directly. If now it is desired to cleanse the gage-tube, this is done by opening the petcock 57. As soon as this cock is opened the counterbalancing of the puppet-valves will be disturbed and they will close automatically. The valves 42 and 43, one or both, may now be opened and steam or water, or both, caused to flow rapidly through the gage-tube and cleansing it out.

Our invention has several advantages over other water-gages, among which may be enumerated the straight clear passage-ways so arranged that when the taps and plugs are removed the device may be cleaned with ease. The valve is so constructed that it seats directly upon the lower end of the plug in which it is arranged, and may be removed with the plug and cleaned or reground in a moment. The main valves being operated by screw-stems from the exterior, can be easily and firmly seated, the opening into the boiler being meanwhile closed by the main stop-valve operated by the screw-stem from the exterior of the gage. The two plugs carrying the automatic valves are of the same size and shape and may be interchanged at will, so that if one of them should get out of order the good one may always be employed to control the water passage-way.

The cleaning-rod 14 is operated by the stem 10 independently of all other parts of the structure, so that the passage-way 4 may be cleaned by the motion of said cleaning-stem while the water and steam in the gage are still and no current of either exists. The result of this stillness of the water and steam will be that the stems may be screwed back as far as they will go, and such of the sediment in the passage-way 4 as, after having been stirred, falls beyond the end of the stem 14, may be pushed back into the boiler, and thus the passage-way cleared of it. The fact of the main valve being controlled by a stem from the exterior of the apparatus makes it possible to begin to blow off for the purpose of cleaning gradually. The location of the automatic valves in a separate cylinder outside of the line of the main gage-cylinder and the existence of an independent passage-way between the two cylinders controlled by an independent valve stem from the exterior of the gage makes it possible to blow off the apparatus without causing the sediment or dirt to pass through the automatic valves. Being very light, they will close under the pressure of the steam below them and the steam will pass out into the main cylinder and escape by the petcock without passing through the automatic valves at all.

The location of the lower automatic valve between the main water-inlet and the petcock makes it possible to control the escape of water and steam should the petcock blow out or be knocked off, for the relief of pressure in the main gage-cylinder from any cause will cause the automatic valves to act and prevent the escape of steam or water. The fact that the automatic valves and main stop-valve are entirely independent of one another makes it unnecessary in turning on the steam and water to do anything more than to open the main stop-valves. The automatic valves will then protect the device from the escape of either steam or water, no matter how much or how little steam may be admitted.

What we claim as new is—

1. In a water-gage, the combination of two taps, each consisting of two cylinders parallel to one another and provided with communicating passage-ways, the main tap passage-way opening into one of them only, said first cylinder being provided with an automatic valve mechanism controlling the passage-way between it and the second cylinder, a main stop-valve operated by a stem from the exterior of the apparatus and controlling the main tap-inlet, and a second independent passage-way between the two cylinders controlled by an independent stem-valve and so located that when it is opened steam or water may pass directly from one cylinder to the other without passing through the automatic valve, substantially as described.

2. In a water-gage, the combination of two taps or spigots, each consisting of two cylinders, each tap being cast in one piece and provided with a communicating passage-way, each cylinder being opened at the top and each valve-cylinder being closed by a screw-plug, said plugs being hollow and perforated with holes through their centers at right angles to the axis and having an inverted puppet-valve fitted within them and seated upon their lower ends, whereby the communicating passage-way may be closed, the top of the upper gage-tube cylinder being closed by a plug and being of a size sufficient to admit the insertion of the gage-tube through the top of the cylinder, substantially as described.

3. In a water-gage, the combination of two taps or spigots, each consisting of two cylinders and each pair provided with two communicating passage-ways, each cylinder being open at the top and each valve-cylinder being closed by a plug, said plugs having a valve mechanism arranged within each, which is adapted to close one of the communicating passage-ways between the cylinders, and an independent valve and stem operated from the exterior of the cylinder, whereby the second passage-way is controlled and steam and water allowed to flow from one cylinder to the other while the puppet-valve is closed, the lower gage-tube cylinder having a petcock for the escape of steam when cleaning.

4. In a water-gage apparatus, the combination of two taps, each containing two cylinders, one of each pair fitted with a plug in which is arranged an automatic valve mechanism and the other provided with a glass tube connecting the two taps together, the main passage-way from the boiler entering the valve-cylinders, and the valve-cylinders connected with the gage-cylinder by a passage-way controlled by the automatic valves to the gage-cylinder, said valve-plugs being of identical structure, so that they may be interchanged at will, substantially as described.

Signed at Baltimore, in the State of Maryland, this 3d day of March, A. D. 1891.

JOHN F. WALTERS.
JOHN J. BROWN.

Witnesses:
MOSES NORRIS,
JAS. W. CLAYTON.